3,045,031
6α-METHYL-9α-FLUORO-11-OXYGENATED PROGESTERONES
George B. Spero, Portage Township, Kalamazoo County, and John L. Thompson, Kalamazoo, Mich., assignors to The Upjohn Company, Kalamazoo, Mich., a corporation of Delaware
No Drawing. Filed Oct. 31, 1960, Ser. No. 65,904
5 Claims. (Cl. 260—397.3)

The present invention relates to steroid compounds and is concerned with 6α-methyl-9α-fluoro-11β-hydroxy-progesterone and 1-dehydro-6α-methyl-9α-fluoro-11β-hydroxyprogesterone, the 11-keto analogs, and a process of production thereof.

The present application is a continuation in part of application Serial Number 623,821, filed November 23, 1956, now abandoned.

The new compounds and the process of the present invention are illustratively represented by the following formulae:

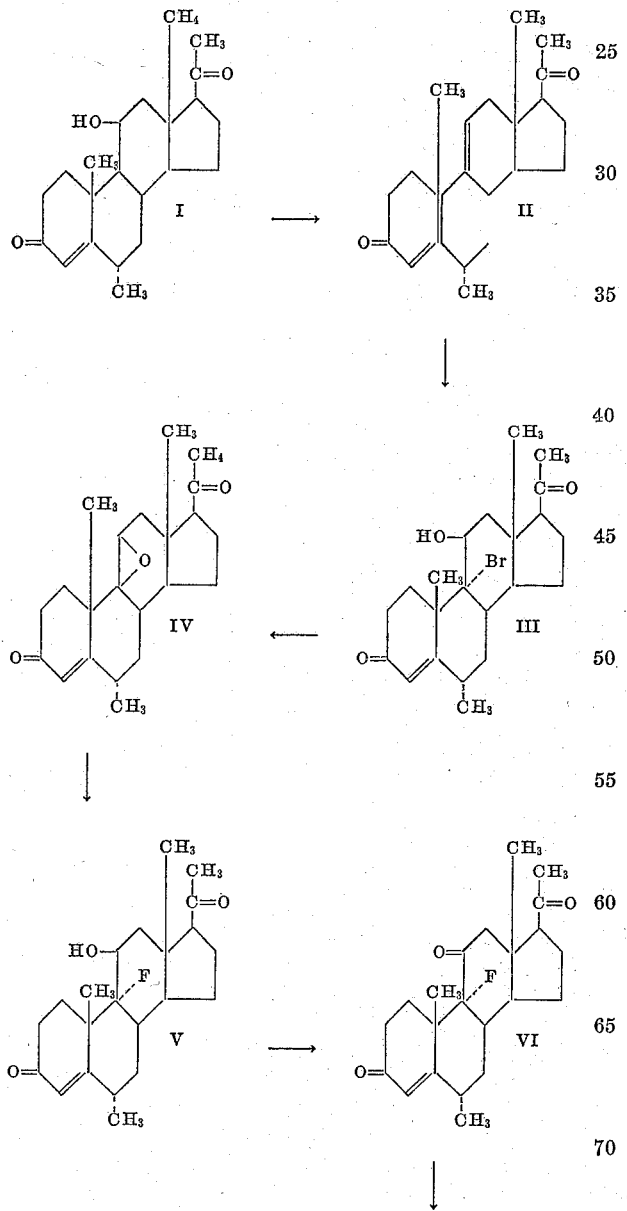

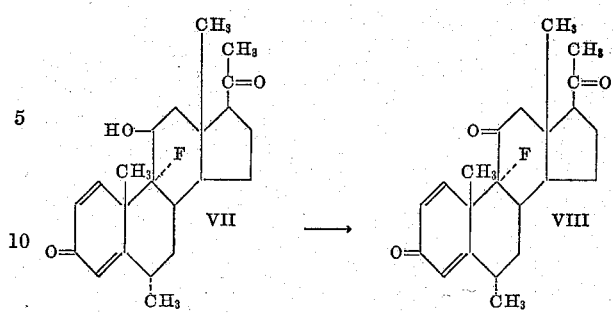

The novel compounds of the present invention of Formulas V thru VIII, inclusive, which can be represented by the following formula:

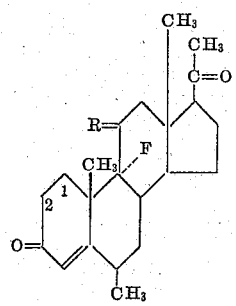

wherein R is selected from the group consisting of ketonic oxygen and

and wherein the linkage between carbon atoms 1 and 2 is selected from linkages consisting of single and double bonds, possess high glucocorticoid, anti-inflammatory, mineral corticoid and progestational activities. The novel compounds are useful as topical or systemic anti-inflammatory agents for the treatment of inflammations of skin, eyes, ears and systemically mainly for arthritis. They are furthermore useful as progestational agents wherever greater progestational activity is required, e.g., in the treatment of menorrhagia including hyper- and polymenorrhea. The compounds are moreover of value in the treatment of ketosis of cattle.

The compounds of the present invention can be prepared and administered to mammals, birds, humans and animals in a wide variety of oral and parenteral dosage forms, simply or in admixture with other co-acting compounds. They also can be used in the form of ointments, lotions, creams, jellies and drops suitable for the treatment of inflamed skin areas, eyes, ears, or nose irritations. The solid compositions can take the form of tablets, powders, capsules or the like, preferably in unit dosage forms for simple administration of precise dosages.

Liquid compositions can be prepared of these compounds taking the form of solutions, emulsions, suspensions or elixirs and injectibles, particularly intra-articular injectibles.

The process of the present invention comprises: dehydrating 6α-methyl-11β-hydroxyprogesterone (I) in conventional manner, for example with a N-halo-acylamide and sulfur dioxide, or alternatively for example an acid such as sulfuric acid in acetic acid, to obtain 6α-methyl-4,9(11)-pregnadiene-3,20-dione (II); adding to a solution of the thus-obtained 4,9(11)-pregnadiene (II), dissolved in an organic solvent, a N-halo-acylamide in the presence of an acid to obtain the corresponding 6α-methyl-9α-halo-11β-hydroxy-4-pregnene-3,20-dione (III); treating compound III with a mild base to obtain 6α-methyl-9β,-

11β-oxido-4-pregnene-3,20-dione (IV); and treating this oxido compound (IV) with a source of hydrogen fluoride to obtain 6α-methyl-9α-fluoro-11β-hydroxy-4-pregnene-3,20-dione.

Oxidizing 6α-methyl-9α-fluoro-11β-hydroxy-4-pregnene-3,20-dione with a chromic acid oxidant, or hypohalous acid preferably produced in situ, results in 6α-methyl-9α-fluoro-4-pregnene-3,11,20-trione (VI). Submitting 6α-methyl-9-fluoro-11β-hydroxy-4-pregnene-3,20-dione (V) or 6α-methyl-9α-fluoro-4-pregnene-3,11,20-trione (VI) to dehydrogenation by micro-organism such as Septomyxa, Calonectria, Alternaria, Colletotrichum, Cylindrocarpon, Ophiobolus, Listeria, Corynebacterium, Erysipelothrix, species of the family Tuberculariaceae, Nocardia, Cucurbitaria, Leptosphaeriae, Tricothecium, Mycobacterium, Fusarium, Didymella and the like, or dehydrogenation with selenium dioxide results in the production of 6α-methyl-9α-fluoro-11β-hydroxy-1,4-pregnadiene-3,20-dione (VII) or respectively 6α-methyl-9α-fluoro-1,4-pregnadiene-3,11,20-trione (VIII).

The starting material 6α-methyl-11β-hydroxyprogesterone has been disclosed in the application Serial Number 623,821, filed November 23, 1956.

The following examples are illustrative of the product and the process of the present invention and are not to be construed as limiting.

*Example 1.—6α-Methyl-4,9(11)-Pregnadien-3,20-Dione*

A solution of 5.0 grams of 6α-methyl-11β-hydroxyprogesterone in 58 milliliters of dry pyridine (distilled over barium oxide), was treated with 3.0 grams of N-bromoacetamide. The mixture was stirred for fifteen minutes and cooled to 0° centigrade. Gaseous sulfur dioxide was slowly passed over the surface of the reaction mixture for a period of one-half hour at 12° centigrade until the reaction mixture gave a negative reaction with potassium iodide-starch paper. The reaction mixture was then poured into 150 milliliters of ice-water and stirred. A yellowish-white gummy material was collected on filter paper; the filtrate was extracted with three fifty-milliliter portions of methylene chloride, and the gum was dissolved in the combined extracts of methylene chloride. The thus-obtained methylene chloride solution was washed several times with water, then dried over anhydrous sodium sulfate and evaporated to dryness at 60 degrees in vacuo to yield a residue of 4.62 grams. This residue was chromatographed over 350 grams of Florisil magnesium silicate. For the chromatography the 4.62 grams of residue was redissolved in 350 milliliters of methylene chloride and poured over the Florisil charged column. The first three fractions of 375 milliliters each of a solvent consisting of 5 percent acetone and 95 percent Skellysolve B hexanes, were collected and discarded. Thereupon 15 fractions of 375 milliters each, consisting of 8 percent acetone and 92 percent Skellysolve B hexanes were collected, combined, dried and evaporated to give 3.27 grams of yellowish crystals. These crystals were recrystallized from methanol to give 2.18 grams of product melting between 115 to 118 degrees C. Yeld, 46.3 percent of theory. An analytical sample was prepared which melted at 117 to 119.5 degrees and had rotation [α]$_D$ at 22 degrees centigrade of plus 114 degrees in acetone.

*Analysis.*—Calcd. for $C_{22}H_{30}O_2$: C, 80.94; H, 9.26. Found: C, 80.80; H, 9.19.

*Example 2.—6α-Methyl-9α-Bromo-11β-Hydroxy-4-Pregnene-3,20-Dione*

A solution of 3.68 grams of 6α-methyl-4,9(11)-pregnadien-3,20-dione in 68 milliliters of methylene chloride and 132 milliliters of tertiary butanol was prepared. To this solution was added at room temperature (about 23° C.) a solution of 10.45 milliliters of 72 percent perchloric acid in 78.8 milliliters of water and a solution of 1.92 grams of N-bromoacetamide in 33.5 milliliters of tertiary butanol. The mixture was stirred for fifteen minutes and thereupon a solution of 1.92 grams of sodium sulfite in 104.5 milliliters of water was added. The mixture was then concentrated in vacuo until crystals appeared. The reaction mixture was thereupon cooled to 5 degrees C. and diluted with stirring with 350 milliliters of ice-cold water. A solid of an off-white color was collected on filter paper, washed with water until neutral and dried in a vacuum desiccator at room temperature. The material obtained weighed 4.9 grams (102 percent of theory) and possessed a melting point of 144.5 to 145.5 degrees centigrade. This material was used in the next step without further purification.

*Example 3.—6α-Methyl-9β,11β-Oxido-4-Pregnene-3,20-Dione*

A solution of 4.9 grams of crude 6α-methyl-9α-bromo-11β-hydroxy-4-pregnene-3,20-dione, as obtained in Example 2, in 168 milliliters of acetone, was stirred and refluxed with 5.8 grams of anhydrous potassium acetate for a period of 20½ hours. The yellow mixture was concentrated in vacuo to 75 milliliter volume and poured thereupon into one liter of water. After extracting the reaction mixture with three 250-milliliter portions of methylene chloride, drying the extracts over anhydrous sodium sulfate and evaporating to dryness in vacuo, 3.57 grams of an oil was obtained. The oil was dissolved in 300 milliliters of methylene dichloride and poured over a column of 300 grams of Florisil magnesium silicate. The column was developed with 16 portions of 8 percent acetone-92 percent Skellysolve B hexanes, and one portion of 10 percent acetone-90 percent Skellysolve B. Each solvent portion was 375 milliliters. Fractions 6 through 16 were combined, dried and evaporated to give 3.1 grams of semi-crystalline material which was recrystallized from methanol to give 2.35 grams of product as needles of melting point 119 to 122. The yield was therefore 61 percent of theory. An analytical sample was prepared which melted at 120.5 to 122 degrees centigrade and had a rotation of [α]$_D$ of plus 69 degrees in acetone.

*Analysis.*—Calcd. for $C_{22}H_{30}O_3$: C, 77.15; H, 8.83. Found: C, 76.84; H, 8.73.

*Example 4.—6α-Methyl-9α-Fluoro-11β-Hydroxy-4-Pregnene-3,20-Dione*

A solution of 2.03 grams of 6α-methyl-9β,11β-oxido-4-pregnene-3,20-dione in 30 milliliters of methylene chloride and 16.8 grams of tetrahydrofuran was cooled in a Dry-Ice bath for ten minutes. This solution was added portionwise in a ten minute period with agitation to 9.6 grams of hydrofluoric acid, cooled in a Dry-Ice bath, in a polyethylene bottle. After standing in the bath for twenty minutes and thereafter in a refrigerator for 17 hours, the light amber colored solution was poured into a solution of 46 grams of sodium bicarbonate in 920 milliliters of water and stirred until gas evolution ceased. The mixture was then separated and the aqueous layer was extracted with methylene chloride. The combined extracts and organic layer were washed with water, dried over anhydrous sodium sulfate and evaporated to dryness in vacuo at 60 degrees. The thus-obtained oily residue of 3.15 grams weight was redissolved in 300 milliliters of methylene chloride and poured through a column, charged with 315 grams of Florisil magnesium silicate. This column was developed as follows: Fractions 1 through 6 with solutions of 8 percent acetone and 92 percent Skellysolve B hexanes; fractions 7 through 12, 12 percent acetone and 88 percent Skellysolve B hexanes. All fractions were 630 milliliter portions. Fractions 9 through 12 were combined and evaporated to give 1.46 grams of semi-crystalline material. This material was recrystallized from methanol to give 1.23 grams of product as white crystals of melting point 170 to 172.5 degrees. An analytical sample prepared by additional crystallization from methanol melted at 172 to 172.5 degrees and had rotation of [α]$_D$ plus 171 in acetone.

*Analysis.*—Calcd. for $C_{22}H_{31}O_3F$: C, 72.90; H, 8.62; F, 5.24. Found: C, 72.72; H, 8.98; F, 5.30.

Alternatively, 6α - methyl - 9α - fluoro - 11β-hydroxy-4-pregnene-3,20-dione can be conveniently prepared from 5α,11α-dihydroxy-6β-methylpregnane-3,20-dione [Spero et al., J. Am. Chem. Soc. 78, 6213 (1956)] by making the 11α-toluenesulfonate in known manner with toluenesulfonyl chloride, dehydrating the toluenesulfonate by heating in aqueous solution to obtain 5α-hydroxy-6β-methyl-9(11)-pregnene-3,20-dione, dehydrating thereafter with sodium hydroxide solution to obtain 6α-methyl-4,9(11)-pregnadiene-3,20-dione. This compound is then submitted to the steps shown in Examples 2 to 4, inclusive, to give the desired product 6α-methyl-9α-fluoro-11β-hydroxy-4-pregnene-3,20-dione.

*Example 5.—6α-Methyl-9α-Fluoro-11-Ketoprogesterone*

To a solution of 0.5 grams of 6α-methyl-9α-fluoro-11β-hydroxyprogesterone in 10 milliliters of acetic acid was added 150 milligrams of chromic anhydride, dissolved in three milliliters of acetic acid and 0.2 milliliter of water. The mixture was allowed to stand at room temperature (24 degrees C.) for a period of four hours, then poured into 50 milliliters of water, neutralized with sodium bicarbonate and extracted with three 25-milliliter portions of methylene chloride. The methylene chloride extracts were combined, washed twice with water, dried over anhydrous sodium sulfate, evaporated and the residue twice recrystallized from methanol to give 6α-methyl-9α-fluoro-4-pregnene-3,11,20-trione (6α-methyl-9α-fluoro-11-ketoprogesterone).

*Example 6.—1 - Dehydro-6α-Methyl-9α-Fluoro-11β - Hydroxyprogesterone (6α-Methyl-9α-Fluoro-11β-Hydroxy-1,4-Pregnadiene-3,20-Dione)*

0.7 gram of 6α-methyl-9α-fluoro-11β-hydroxyprogesterone was dissolved in 50 milliliters of tertiary butyl alcohol and thereto was added five milliliters of acetic acid and 250 milligrams of selenium dioxide. The mixture was heated to 75 degrees centigrade and stirred for a period of 24 hours. Thereafter another portion of 250 milligrams of selenium dioxide was added and heating at 75 degrees centigrade and stirring continued. The mixture was thereupon cooled, filtered to remove the excess selenium dioxide and evaporated. The thus-obtained residue was recrystallized four times from acetone-Skellysolve B hexane hydrocarbons to give pure 1-dehydro-6α-methyl-9α-fluoro-11β-hydroxyprogesterone.

*Example 7.—1-Dehydro-6α-Methyl-9α-Fluoro-11-Ketoprogesterone*

In the same manner given in Example 5, oxidizing with chromic anhydride in acetic acid 1-dehydro-6α-methyl-9α-fluoro-11β-hydroxyprogesterone, yielded 1-dehydro-6α-methyl-9α-fluoro-11-ketoprogesterone (6α - methyl - 9α-fluoro-1,4-pregnadiene-3,11,20-trione).

An alternate method to produce 1-dehydro-6α-methyl-9α-fluoro-11β-hydroxyprogesterone is as follows:

*Example 8.—1-Dehydro-6α-Methyl-9α-Fluoro-11β-Hydroxyprogesterone*

Five 100-milliliter portions of a medium in 250-milliliter Erlenmeyer flasks containing one percent Cerelose corn sugar, two percent corn steep liquor (60 percent solids) and tap water was adjusted to a pH of 4.95. This medium was sterilized for one hour at twenty pounds per square inch pressure and 120 degrees centigrade and inoculated with a one to two day growth of *Septomyxa affinis* A.T.C.C. 6737. The Erlenmeyer flasks were shaken at room temperature (about 24 degrees centigrade) for a period of three days. At the end of this period, this 500-milliliter volume was used as an inoculum for ten liters of the same glucose-corn steep liquor medium which in addition contained ten milliliters of an antifoam (a mixture of lard oil and octadecanol). The fermentor was placed into the water bath, adjusted to 28 degrees centigrade, and the contents stirred (300 r.p.m.) and aerated (0.5 l. air per 10 l. beer per minute). After nineteen hours of incubation, when a good growth developed, two grams of 6α-methyl-9α-fluoro-11β - hydroxyprogesterone, dissolved in fifty milliliters of acetone, and one gram of 11β,21-dihydroxy-4,17(20)-pregnadiene-3-one as promoter was added and the incubation (conversion) carried out at the same temperature and aeration for nineteen hours. The mycelium was filtered and the steroidal material was extracted with four three-liter portions of methylene chloride. The mycelium was extracted with two 500-milliliter portions of acetone and two 500-milliliter portions of methylene chloride. The extracts were combined, evaporated and the residue chromatographed over Florisil synthetic magnesium silicate. The fractions obtained with 5 to 15 percent acetone-Skellysolve B hexanes were combined, evaporated and the residue twice recrystallized from methanol to give white crystals of 1-dehydro-6α-methyl-9α-fluoro-11β-hydroxyprogesterone.

In the same manner given in Example 8 submitting 6α-methyl-9α-fluoro-4-pregnene-3,11,20-trione to fermentation by *Septomyxa affinis* A.T.C.C. 6737 results in the production of 1-dehydro-6α-methyl-9α-fluoro-11-ketoprogesterone. Alternatively 1-dehydro-6α-methyl-9α-fluoro-11-ketoprogesterone is obtained by oxidizing 1-dehydro-6α-methyl-9α-fluoro-11β-hydroxyprogesterone as shown in Example 5.

Instead of using *Septomyxa affinis* in the dehydrogenation of Example 8, 1-dehydro-6α-methyl-9α-fluoro-11β-hydroxyprogesterone and 1-dehydro-6α-methyl-9α-fluoro-11-ketoprogesterone can be prepared by dehydrogenating 6α-methyl-9α-fluoro-11β-hydroxyprogesterone or respectively 6α-methyl-9α-fluoro-11-ketoprogesterone with other species of the genus Septomyxa or species selected from the microorganisms of the genera: Calonectria, Alternaria, Colletotrichum, Cylindrocarpon, Ophiobolus, Listeria, Corynebacterium, Erysipelothrix species of the family Tuberculariaceae, Nocardia, Cucurbitaria, Leptosphaeriae, Tricothecium, Mycobacterium, Fusarium, Didymella and the like.

We claim:

1. A 6α-methyl-9α-fluoro-11-oxygenated-progesterone of the formula

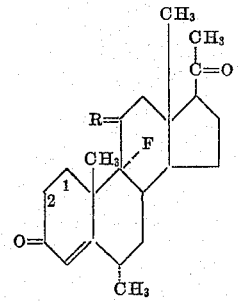

wherein R is selected from the group consisting of ketonic oxygen and

and wherein the linkage between carbon atoms 1 and 2 is selected from linkages consisting of single and double bonds.

2. 6α-methyl-9α-fluoro-11β-hydroxyprogesterone.

3. 1-dehydro-6α-methyl-9α-fluoro-11β - hydroxyprogesterone.

4. 6α-methyl-9α-fluoro-11-ketoprogesterone.

5. 1-dehydro-6α-methyl-9α-fluoro-11-ketoprogesterone.

References Cited in the file of this patent

UNITED STATES PATENTS

| | | |
|---|---|---|
| 2,854,383 | Herzog et al. | Sept. 30, 1958 |
| 2,897,218 | Sebek et al. | July 28, 1959 |

UNITED STATES PATENT OFFICE
CERTIFICATE OF CORRECTION

Patent No. 3,045,031                        July 17, 1962

George B. Spero et al.

It is hereby certified that error appears in the above numbered patent requiring correction and that the said Letters Patent should read as corrected below.

Column 1, lines 23 to 35, formula I should appear as shown below instead of as in the patent:

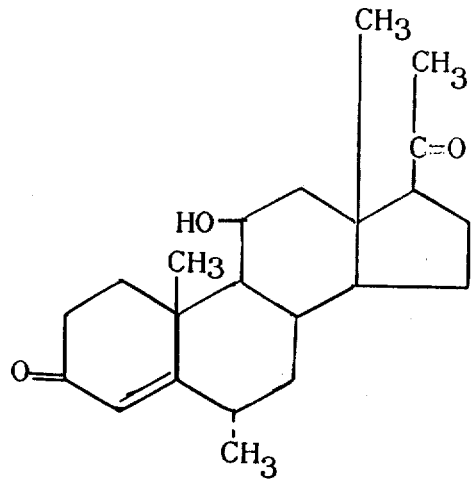

same lines 23 to 35, formula II should appear as shown below instead of as in the patent:

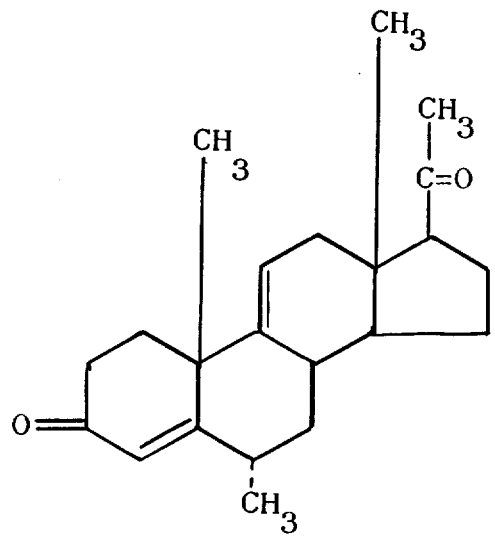

3,045,031 same column 1, lines 41 to 52, formula IV should appear as shown below instead of as in the patent:

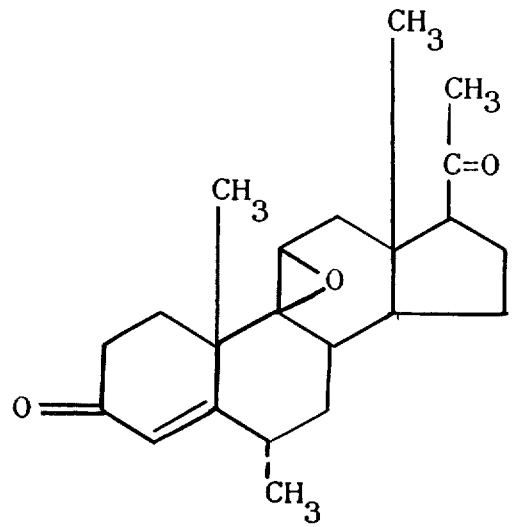

column 3, line 9, for "6α-methyl-9 -fluoro-" read -- 6α-methyl-9α-fluoro- --; same column 3, line 59, for "Yeld" read -- Yield --.

Signed and sealed this 20th day of November 1962.

(SEAL)
Attest:

ERNEST W. SWIDER
Attesting Officer

DAVID L. LADD
Commissioner of
Patents